Feb. 21, 1939. W. A. DENNIS 2,148,111
TIRE TOOL
Filed April 28, 1937
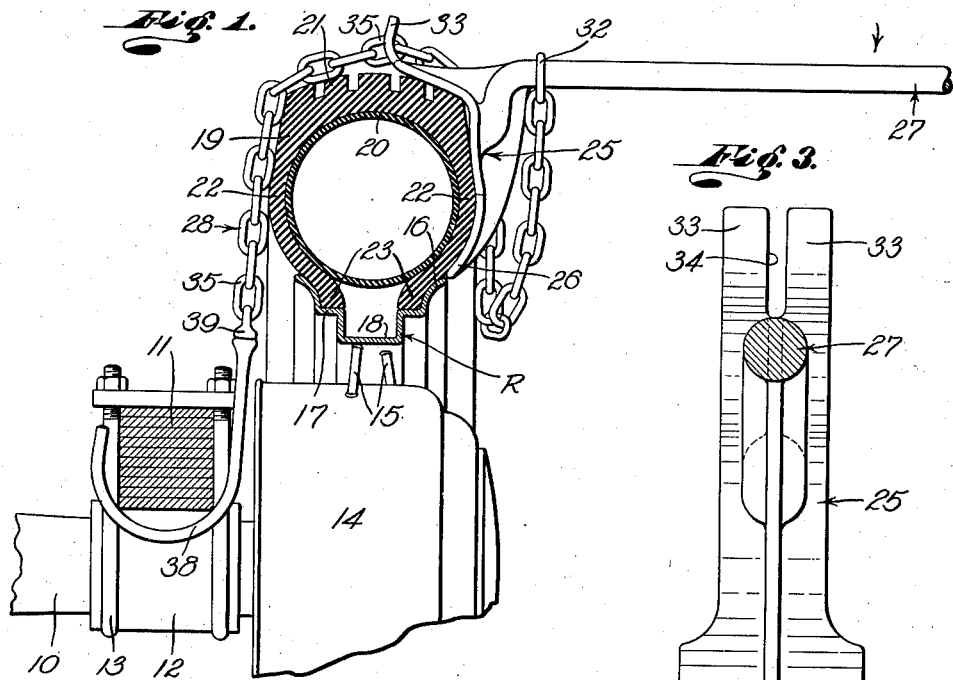
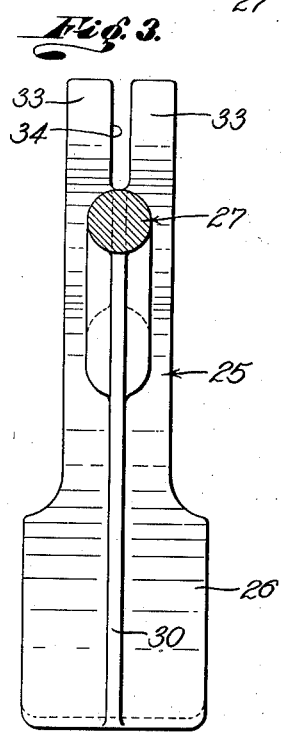
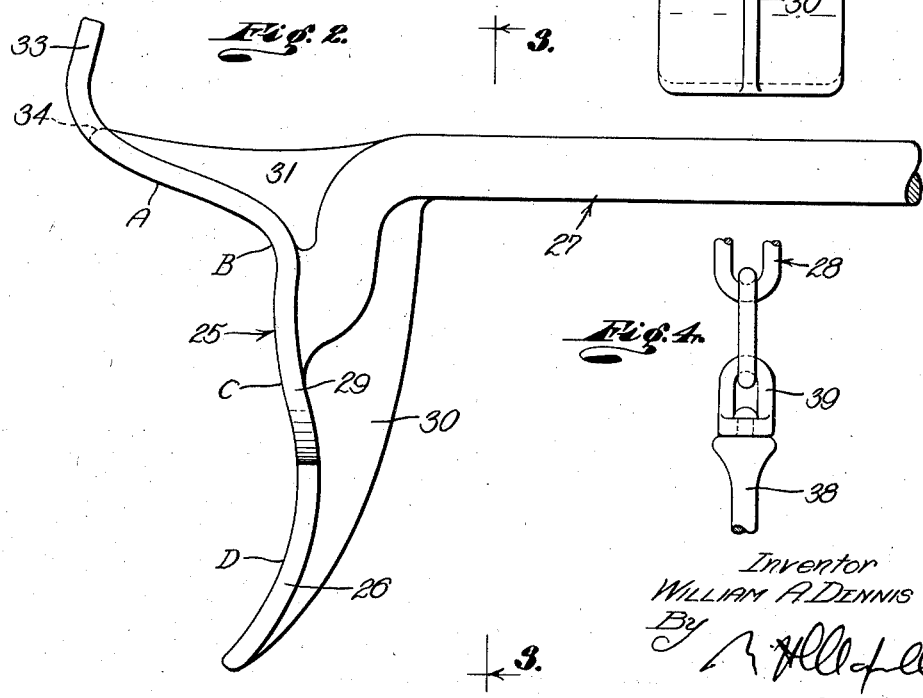
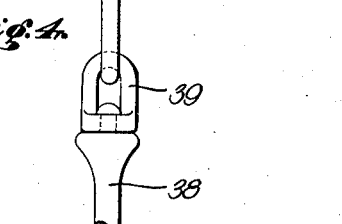
Inventor
WILLIAM A DENNIS
By
His Attorney Patented Feb. 21, 1939

2,148,111

UNITED STATES PATENT OFFICE 2,148,111

TIRE TOOL

William A. Dennis, Los Angeles, Calif.

Application April 28, 1937, Serial No. 139,527

1 Claim. (Cl. 157—6)

This invention relates to a device useful in removing tires from rims and relates more particularly to a tool for facilitating the freeing or removal of pneumatic tires from the rims of vehicle wheels. A general object of this invention is to provide a simple, practical and very effective tool for facilitating the removal of pneumatic tires from the drop center type wheel rims.

When it becomes necessary to remove a pneumatic tire from a drop center rim of a vehicle wheel it is the usual practice to remove the entire wheel from the vehicle and then lay the wheel flat upon the ground. The person removing the tire then usually stands upon the deflated tire casing to employ his weight to free the bead of the tire from the rim, and then uses a screw driver, tire tool, or the like, to force the tire bead into the depressed center of the rim. After freeing the tire beads from the rim it is often necessary to mount the wheel on a rack, or the like, and then pull the tire casing from the wheel rim. These operations are time consuming and the tire or tire casing is often injured by the tire tools or devices used to pry the beads into the groove of the drop center rim.

An important object of this invention is to provide a tool that is operable to free or release a bead of a pneumatic tire casing from a drop center rim while the wheel is on the vehicle, whereby the tire may be easily removed from the rim without dismounting the wheel from the vehicle.

Another object of this invention is to provide a tool of the character mentioned that is operable to press or force a bead of the tire casing into the depressed center of the wheel rim and thus loosen the tire for easy removal from the wheel without cutting, cracking, marring, breaking or otherwise injuring the tire casing.

Another object of this invention is to provide a tool of the character mentioned that is easy to operate and that does not require the application of heavy manual forces.

Another object of this invention is to provide a tool of the character mentioned that is operable to loosen or free a bead of a tire from the vehicle wheel in such a manner that the inner tube may be removed from the tire casing for replacement or patching without removing the tire carcass or casing from the wheel.

Another object of this invention is to provide a tire tool of the character mentioned that is adapted to facilitate the removal of pneumatic tire casings from the front wheels as well as the rear wheels of the various forms of vehicles and is easily adjusted for the removal of tires of various sizes and makes.

A further object of this invention is to provide a tire tool of the character mentioned that is small, compact and light in weight and that is suitable for use in service stations, tire dealers' establishments, as well as by the motorist.

The various objects and features of my invention will be fully understood from the following detailed description of a typical preferred form and application of my invention, throughout which description reference is made to the accompanying drawing, in which:

Fig. 1 is a vertical sectional view of a portion of a typical vehicle wheel and the adjacent parts showing the tool of the present invention in position for the loosening of the tire from the wheel rim, and illustrating certain of the parts in side elevation. Fig. 2 is an enlarged side elevation of the body of the tool with a portion of the handle broken away. Fig. 3 is a sectional view taken as indicated by line 3—3 on Fig. 2 showing the outer side of the tool body in elevation, and Fig. 4 is a fragmentary view of the chain and its swivel connection with the hook.

The device or tool provided by the present invention is adapted to be employed to facilitate the removal of pneumatic tires from vehicle wheels of various characters and from the wheels of the several types of vehicles. The tool is particularly adapted for the removal of pneumatic tires from the so-called drop center type of wheel rims and in the following detailed description I will describe a typical embodiment of the invention as employed to remove a pneumatic tire from a drop center rim of a wire wheel of the class embodied in automotive vehicles.

The portion of the vehicle illustrated in Fig. 1 of the drawing includes an axle housing 10 and a laminated spring 11. A bearing 12 on the axle housing 10 supports the spring 11 and U-bolts 13 secure the spring 11 to the bearing 12. The wheel illustrated comprises a drum-like hub 14 and wire spokes 15 radiating from the hub 14 to carry the wheel rim R. The rim R has outwardly and laterally curved side flanges 16 and annular cylindrical shoulders 17 at the bases of the flanges. The shoulders 17 are concentric with the axis of rotation of the wheel and are of equal diameter. The central portion of the rim R is dropped or depressed toward the axis of the wheel leaving or forming an annular depression or groove 18 between the shoulders 17.

The pneumatic tire shown in the drawing includes the tire carcass or casing which I will herein term the tire 19, and the usual inflatable inner tube 20. The tire 19 has the usual tread 21, side walls 22 and beads 23. When the tire is in the operative position on the rim R the inner surfaces of the beads 23 bear on the shoulders 17 and the outer sides of the beads 23 bear outwardly against the rim flanges 16. The groove 18 of the rim R is adapted to receive one or both of the tire beads 23 when the tire 19 is being mounted or dismounted. The beads 23 of the inflated tire are tightly forced against the flanges 16 and may often adhere to the flanges making it very difficult to remove the tire from the rim.

The tire tool of the present invention comprises, generally, a body 25 having a tongue or blade 26 for bearing against a side wall 22 of the tire 19, a handle 27 projecting from the body 25, and a flexible element 28 adjustably connected with the body 25 and adapted to be removably secured to a relatively stationary part of the vehicle whereby manual force applied to the handle 27 swings the body 25 inwardly against the side wall 22 to force its bead 23 into the groove 18.

The body 25 may be integral and the handle 27 may be an integral part of the body 25 as illustrated in the drawing. The body 25 is shaped to conform, generally, to the side of the carcass or tire 19, that is, its inner or active surface is shaped to substantially conform to the side wall 22 and a portion of the tire tread 21. The body 25 includes a flange 29 presenting a curved surface for engaging against the tire 19. The flange 29 has a substantially flat surface portion A for cooperating with the tire tread 21, a concave surface portion B for engaging against the tread 21 at its outer edge, and a slightly convex surface portion C for engaging against the side wall 22 adjacent the tread 21. The tongue or blade 26 of the body 25 may be an integral extension or continuation of the body flange 29. In the preferred construction the blade 26 is considerably wider than the body flange 29. This relationship between the flange 29 and the blade 26 is best illustrated in Fig. 3 of the drawing. The inner surface or active surface D of the blade 26 forms an unbroken continuation of the inner surface of the body flange 29. The active surface D of the blade 26 is preferably concave to effectively engage against and conform to the side wall 22 of the tire 19. The blade 26 is proportioned so that its outer end may be immediately adjacent the outer or adjacent rim flange 16 when the body 25 is in proper position against the tire 19. The body 25 may further include strengthening ribs or webs 30 and 31 on its rear side. The web 30 may extend longitudinally of the body 25 from the outer end of its blade 26 and the web 31 may extend longitudinally of the body from adjacent the upper end of the body.

The handle 27 is in the nature of a lever for manipulating the tool body 25. The handle 27 may be a bar-like member integral with the body 25 or secured to the body in any suitable manner. In the particular case illustrated the handle 27 is integrally joined with the body 25. The portion of the handle 27 adjacent the body 25 may be curved to connect with the body 29 substantially midway between its ends and to project laterally or outwardly in substantial alignment with the upper end of the body. The handle 29 is of such length that sufficient force may be applied to the body 25 without great physical exertion.

The flexible element 28 is provided to anchor or secure one end of the body 25 to a part of the vehicle or any suitable object so that the body may be swung or rocked by means of the handle 27 in such a manner that the blade 26 is forced inwardly against the tire side wall 22 to free its bead 23 from the shoulder 17 and to move the bead into the groove 18. In accordance with the broader aspects of the invention any suitable flexible member may be employed as the element 28. In the preferred construction the flexible element 28 is in the nature of a chain. One end of the chain or element 28 is preferably secured to the body and handle unit of the tool so that it does not become separated from the unit when the tool is not in use. In the simple arrangement illustrated one end of the element 28 is removably secured to the handle 27 by a clamp or ring 32. The chain or element 28 is of substantial length so that it may be trained across the upper or outer portion of the body 25 to extend across the periphery of the tire 19 to the inner side of the vehicle wheel.

Means is provided on the free end of the element 28 to facilitate its connection with a part of the vehicle, or the like. This means may be in the form of a hook 38 connected with the free end of the flexible element 28 by a suitable swivel joint 39. The hook 38 is preferably of sufficient size to be engaged with the spring 11, the axle housing 10, or the like. If desired, the hook 38 may be hooked about a group of adjacent wheel spokes 15 to secure the free end of the element 28 to the wheel. In any case the flexible element 28 must be trained over the tire tread 21 and is preferably trained inwardly against the inner side wall 22 of the tire 19.

The invention includes simple effective means for connecting the chain or flexible element 28 with the outer or upper portion of the tool body 25 so that the portion of the element 28 connected with the relatively stationary object or part of the vehicle may be under proper tension when force is applied to the handle 27 to press the body blade 26 inwardly against the side wall 22 of the tire 19. The means for connecting the element 28 with the outer portion of the body 25 is releasable and is such that the element 28 may be adjusted or regulated to properly position the body 25 with respect to the tire 19 regardless of the part or object engaged by the hook 38.

The means for adjustably and detachably securing the flexible element 28 with the outer portion of the body 25 includes a fork on the upper or outer end of the body 25 consisting of two spaced tines 33. The tines 33 may be integrally joined with the body flange 29 to form continuations thereof. In the preferred construction the tines 33 are curved outwardly away from the tire tread 21 and slightly in the direction of the handle 27. The tines 33 are spaced apart to have a slot or notch 34 between them. The notch 34 is adapted to receive a link 35 of the flexible element 28 whereby the adjacent link 35 is hooked by or engages against the concave sides of the tines 33. It will be apparent that various or different links 35 of the flexible chain element 28 may be engaged in the notch 34 to adjust or vary the length of the active portion of the element 28 extending from the hook 38 to the tines 33. The link 35 engaging against the concave sides of the tines 33 dependably connects the flexible element 28 with the upper or outer end of the body 25. The notch 34 is open at the outer ends of the spaced tines 33 so that the links 35 may be easily inserted and removed from the notch.

In employing the tool to remove or loosen the tire 19 from the wheel rim R the hook 38 may be engaged under the spring 11 as illustrated in Fig. 1, or may be engaged about any other adjacent part of the vehicle. The body 25 is engaged against the tire 19 so that its surface portions A, B, C and D engage against the tread 21, the outer corner of the tread 21, the upper portion of the side wall 22 and the major portion of the side wall 22, respectively. The chain or flexible element 28 is trained across the inner side of the tire 19 and the exposed part of the tread 21 and one of its links 35 is engaged in the notch 34. In arranging the flexible element or chain 28 in this manner it is preferred to insure its active inner part being under tension and in engagement with the tire 19 when the handle 25 is depressed or swung downwardly. It will be apparent how the flexible element or chain 28 may be adjusted and properly secured to the body 25 by inserting one of its links 35 in the notch 34. The tool is then in condition for operation.

To operate the tool the user pushes downwardly or applies a force to the handle 27 in the direction indicated by the arrow in Fig. 1. Force applied to the handle 27 in this direction tends to rock or swing the entire tool body 25 so that its blade 26 presses inwardly against the side wall 22. When a sufficient force is applied to the handle 27 the blade 26 forces the side wall 22 inwardly so that the side wall is freed from the rim flange 16 and the bead 23 of the side wall is pressed into the groove 18. It will be understood that this inward movement or distortion of the side wall 22 and the bead 23 occurs in the vicinity of the blade 26. The downward force is then removed from the handle 27 and the wheel is moved or partially turned whereupon the handle 27 is again pressed downwardly to force the blade 26 inwardly against the side wall 22 so that another portion of the bead 23 is displaced from the shoulder 17 and moved into the groove 18. These operations are repeated until the entire outer wall 22 of the tire 19 has been freed from its rim flange 16 and a substantial portion of the bead 23 of the tire wall 22 has been pushed into the groove 18. The hook 38 may then be disengaged from the vehicle part and the tool may be moved out of engagement with the tire.

Following the freeing of the outer side wall 22 of the tire 19 from the rim R the entire tire may be removed from the rim R, if desired, by loosening the inner side wall 22 from its flange 16 by means of a mallet or the like, or by merely pulling upon the tire. With both beads 23 loosened from the shoulders 17 and with both side walls 22 released from the rim flanges 16 the tire 19 may be easily pulled from the rim R in the usual manner. If it is desired to inspect, remove or patch the inner tube 20 without removing the tire 19 from the rim R the outer tire wall 22 and its bead 23 may be released or pulled out of the rim R whereupon the inner tube 22 is accessible. In this manner the tire 19 may be removed from the rim R or the inner tube 22 may be inspected or repaired while the tire remains on the rim R.

The present invention provides a simple and very effective device for freeing a pneumatic tire carcass or casing from the flanges and shoulders of a drop center type wheel rim. The tool may be employed to facilitate the removal or freeing of a tire while the wheel remains on the vehicle thus eliminating the necessity for removing the wheel from the vehicle and the subsequent remounting of the wheel upon a rack and then upon the vehicle axle. The device does not in any way injure the tire or any parts of the vehicle. By varying or adjusting the length of the flexible element 28 the hook 38 may be engaged with various adjacent parts of the vehicle and thus the tool is adapted for the freeing or removal of pneumatic tires of various sizes from vehicles of different characters.

Having described only a typical preferred form and application of my invention, I do not wish to be limited or restricted to the specific details herein set forth, but wish to reserve to myself any variations or modifications that may appear to those skilled in the art or fall within the scope of the following claim.

Having described my invention, I claim:

A tool useful in removing a tire casing from a wheel rim having spaced shoulders on which the beads of the casing rest and having a groove between the shoulders, the tool comprising a rigid body having a surface shaped to substantially conform to and bear laterally inward against a side wall of the casing from adjacent the rim to adjacent the casing tread and having a second surface angularly related to the first named surface and adapted to bear radially inward against the tread of the casing, a flexible element connected with the body and adapted to extend across and bear against the other side wall of the casing and the adjacent portion of the tread, means for anchoring the end portion of the element most remote from the body to a stationary object, and handle means on the body whereby force may be applied to the body to press the said first named surface inward against the first named side wall of the casing to shift its bead inward from its shoulder and whereby the second named body surface presses inward on the tread to move the said bead into the groove.

WILLIAM A. DENNIS.